2 Sheets--Sheet 1.

D. J. IRWIN.
Brick-Machines.

No. 136,520.  Patented March 4, 1873.

Witness:  Inventor.
Henry N. Miller  Donald J. Irwin
C. L. Evert  per Alexander Mator
  Attorneys.

2 Sheets--Sheet 2.
D. J. IRWIN.
Brick-Machines.
No. 136,520. Patented March 4, 1873.
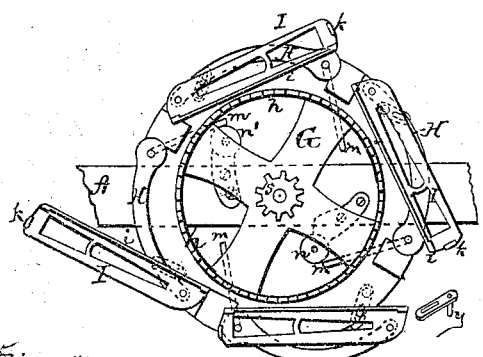
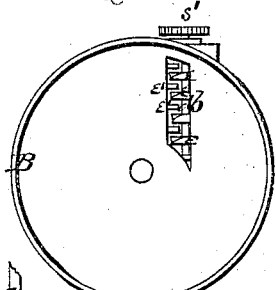
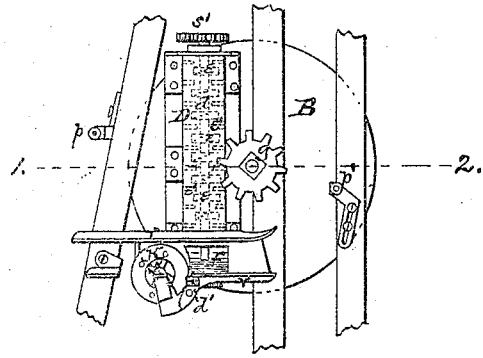
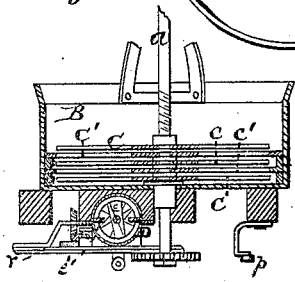
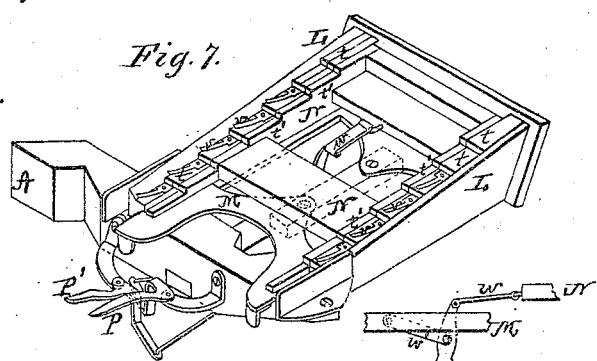
Witness:
Henry N. Miller
C. L. Evert
Inventor.
Donald J. Irwin
per
Alexander Mason,
Attorneys.

UNITED STATES PATENT OFFICE.

DONALD J. IRWIN, OF NOBLE, ILLINOIS.

IMPROVEMENT IN BRICK-MACHINES.

Specification forming part of Letters Patent No. 136,520, dated March 4, 1873.

*To all whom it may concern:*

Be it known that I, DONALD J. IRWIN, of Noble, in the county of Richland and in the State of Illinois, have invented certain new and useful Improvements in Brick-Machine; and do hereby declare that the following is a full, clear, and exact description thereof, reference being had to the accompanying drawing and to the letters of reference marked thereon making a part of this specification.

The nature of my invention consists in the construction and arrangement of a brick-machine, as will be hereinafter more fully set forth.

In order to enable others skilled in the art to which my invention appertains to make and use the same, I will now proceed to describe its construction and operation, referring to the annexed drawing, in which—

Figure 1:
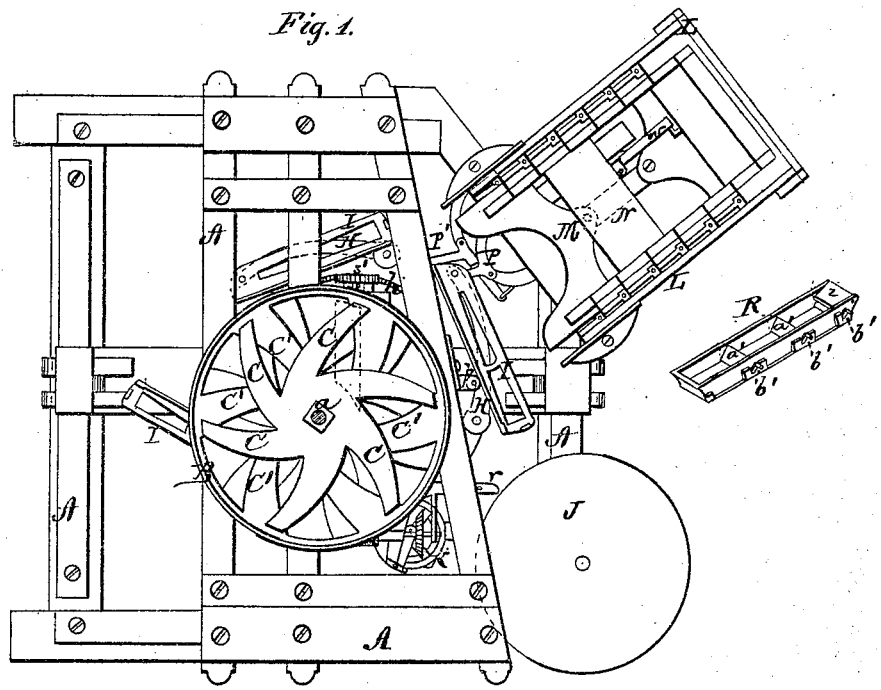
Figure 2:
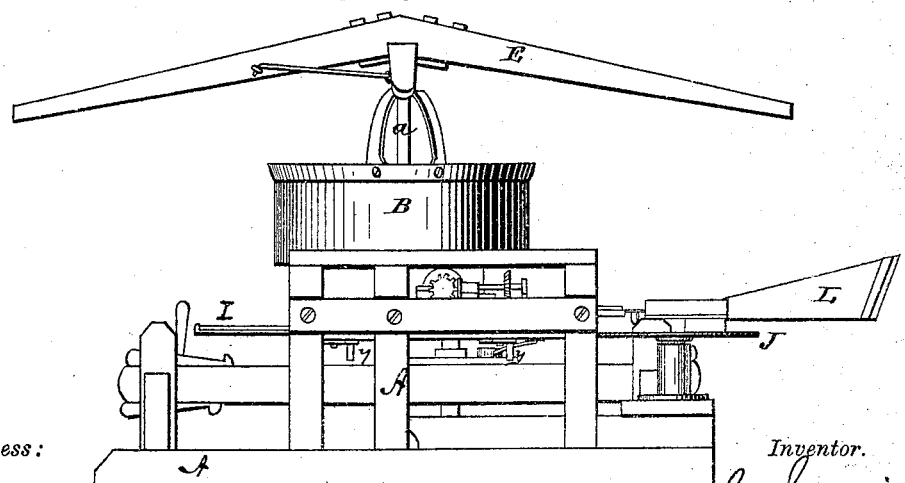

Figure 1 is a plan view, the sweep being removed; and Fig. 2, a side elevation of my entire machine. Fig. 3 is a plan view of the mud-mill with the mixing-mechanism removed, showing the entrance to the feeder below. Fig. 4 is a plan view of the mold-wheel or case-bearer. Fig. 5 is an inverted or bottom view of the mud-mill, showing the feeder and the mechanism connected therewith. Fig. 6 is a section through the line 1 2, Fig. 5; and Fig. 7 is a perspective view of the loading apparatus.

A represents the frame-work of my brick-machine, which may be constructed in any suitable or convenient manner to contain the various working parts of the machine. Upon the frame-work A is located the mud-mill B, which is circular in form and of any suitable dimensions. Within the mill B is the mixing mechanism, consisting alternately of stationary and revolving plates, each plate forming a series of curved cutting-blades, marked, respectively, C' and C. The revolving plates are attached on a central upright shaft, $a$, which passes through suitable bearings above the mill, and its upper end firmly attached to the sweep E, to which the horses are to be attached for operating the machine. The stationary cutting-blades C' and the revolving blades C are curved in opposite directions, as shown in Fig. 1, and when in operation the material from which the bricks are to be made is thoroughly mixed and forced through the aperture $b$ in the bottom of the mill into the cylindrical conductor D attached underneath the mill. Within this conductor the feeder is placed, said feeder consisting of a central shaft, $d$, having teeth or wings $e\ e$ arranged spirally on said shaft, and working between similar stationary teeth or wings, $e'\ e'$, attached to the inside of the conductor D, the effect of which is to feed the mud or clay through the conductor and out through the mouth $f$, and deposit the same in the molds. On the lower end of the central shaft $a$, below the bottom of the mill and at the side of the conductor D, is attached a pinion, $g$, which meshes with a cog-wheel, $s$, attached to the upper surface of a circular wheel or turn-table, G, which is pivoted on a part of the frame A, and thus receives its rotary motion. On the outer edge of the turn-table G, at regular intervals, are pivoted arms H, to the outer end of each of which is pivoted a carrier, I, to receive and carry the molds from the loader to the place of deposit, the turn-table G thus forming the mold-bearer. Along the inner edge of each carrier I is an upward-projecting flange, $i$, and at the rear end is a stop, $k$, against which the mold is to rest. To the pivot of each arm H is attached a crank, $m$, extending under the case-bearer G, as shown in Fig. 4. Below the mold-bearer G, on the frame, are arranged two friction-rollers, $n$ and $n'$, and above the case-bearer, on the frame, are arranged two other friction-rollers, $p\ p'$.

As the mold-bearer G revolves, the inner edge of each carrier I strikes the roller $p$, which brings the carrier in proper position to receive the mold from the loading-mechanism, the arm H being at about the same time drawn or turned partially inward by the crank $m$ striking the roller $n$. As the bearer revolves, the rollers $n'$ and $p'$, acting upon the crank $m$ and carrier I, throw the arm and carrier into the proper position for the mold to enter between the guides $r\ r$ arranged on each side of the mouth $f$, as shown in Fig. 5, where the mold is filled, and from whence it passes onto a receiving-table, J, revolving on its center. While the mold is passing between the guides $r\ r$, the arm H and carrier I are drawn outward from the mold-bearer, and are then by the rollers $n$ and $p$ brought into position again to receive another mold from the loader. At the front end of the mouth $f$ is a circular cutter or trimmer, K, revolved by means of suitable bevel-gearing from the feed-shaft $d$, and this shaft is revolved by a pinion, $s'$, on its end, gearing with the crown-wheel $h$ on the upper face of the mold-carrier G.

The loader is constructed in the following manner: L represents a stationary frame, having along its sides on the inner side inclined step-bars $t$, upon each step of which is secured a spring, $v$. Within this stationary frame is a sliding plate, M, and on top of the same is a sliding frame, N, having inclined step-bars $t'$ on the sides, corresponding with the step-bars on the stationary frame. Below the stationary frame L is pivoted a lever, O, the upper end of which is connected with the rear end of the sliding frame N by a link, $w$. Between the upper end and the pivot-point of the lever O a link, $w'$, connects with the sliding plate M, so that when the lever O is turned on its pivot the frame N will move faster or further than the plate M. The lower end of the lever O is, by rods $x$ and $x'$, connected with two elbow-levers, P and P', respectively. These levers are operated by means of pins or projections $y$ attached adjustably on the under side of the mold-bearer G, one for each of the carriers. These pins or projections in rotation strike the lever P, moving the plate M and frame N forward to deposit one mold on the carrier, and the pin then strikes the other lever P', which draws said parts back to their former position. A series of molds, R, are placed on the stationary step-bars $t$, and by the movement of the plate and sliding frame they are moved downward or inward on the same, one mold being deposited on a carrier at each movement inward of said plate and frame.

The molds R are constructed as shown in Fig. 1, the front end being inclined and provided with a hinged apron, $z$. The mold is also provided with transverse partitions $a'$, which are pivoted at their lower ends, and on one side there is a crank, $b'$, attached to or formed on the pivot. The partitions $a'$ should be thrown down when the mold is placed on the carrier, and just as each space is under or opposite to the mouth $f$ the crank $b'$ is turned by a roller, $d'$, shown in Fig. 5, to raise the partition.

Having thus fully described my invention, what I claim as new, and desire to secure by Letters Patent, is—

1. The revolving mold-bearer G, provided with a series of arms, H, pivoted at regular intervals to its outer edge, and each arm having a carrier, I, pivoted to its outer end, substantially as and for the purposes herein set forth.

2. The carrier I, pivoted to the outer end of the pivoted arm H and provided with the flange $i$ and the stop $k$, substantially as and for the purposes herein set forth.

3. The combination of the crank $m$ on the pivot of the arm H and the rollers $n$ and $n'$, for the purposes herein set forth.

4. The combination of the flange $i$ on the carrier I and the rollers $p$ and $p'$, for the purposes herein set forth.

5. The combination of the arm H with crank $m$ on its pivot, the carrier I with flange $i$, and the rollers $n$ $n'$ and $p$ $p'$, all substantially as and for the purposes herein set forth.

6. The loading mechanism, consisting of the stationary frame L with step-bars $t$ $t$ and springs $v$ $v$, the movable plate M, and the movable frame N with step-bars $t'$ $t'$, substantially as and for the purposes herein set forth.

7. The combination, with the loader, of the lever O, links $w$ $w'$, rods $x$ $x'$, levers P P', and pin or projection $y$ on the mold-carrier G, substantially as and for the purposes herein set forth.

In testimony that I claim the foregoing I have hereunto set my hand this 29th day of October, 1872.

DONALD J. IRWIN.

Witnesses:
WILLIAM HAINES,
HENRY S. LANGDON.